(12) United States Patent
Lin et al.

(10) Patent No.: US 8,055,799 B2
(45) Date of Patent: Nov. 8, 2011

(54) METHOD AND APPARATUS FOR PROVIDING AN INTERFACE FOR A MESSAGING MAILBOX

(75) Inventors: Lin Lin, Belleville (CA); Ping Lin, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 12/721,977

(22) Filed: Mar. 11, 2010

(65) Prior Publication Data

US 2010/0169449 A1   Jul. 1, 2010

Related U.S. Application Data (62) Division of application No. 10/955,197, filed on Sep. 30, 2004, now Pat. No. 7,711,856.

(51) Int. Cl.
G06F 15/16 (2006.01)
G06F 13/00 (2006.01)

(52) U.S. Cl. .................. 709/246; 709/247; 711/170

(58) Field of Classification Search ............ 709/202, 709/204, 205, 206, 219, 220, 221, 223; 711/170
See application file for complete search history.

(56) References Cited

U.S. PATENT DOCUMENTS

| | | | | |
|---|---|---|---|---|
| 5,497,373 A | * | 3/1996 | Hulen et al. | 370/259 |
| 5,532,940 A | * | 7/1996 | Agarwal et al. | 709/204 |
| 5,535,138 A | * | 7/1996 | Keith | 709/204 |
| 5,539,908 A | | 7/1996 | Chen et al. | |
| 5,812,789 A | * | 9/1998 | Diaz et al. | 709/247 |
| 5,864,681 A | * | 1/1999 | Proctor et al. | 709/247 |
| 5,987,100 A | * | 11/1999 | Fortman et al. | 379/88.14 |
| 6,041,295 A | | 3/2000 | Hinderks | |
| 6,058,459 A | * | 5/2000 | Owen et al. | 711/151 |
| 6,170,047 B1 | * | 1/2001 | Dye | 711/170 |
| 6,173,381 B1 | * | 1/2001 | Dye | 711/170 |
| 6,282,269 B1 | * | 8/2001 | Bowater et al. | 379/88.17 |
| 6,356,545 B1 | | 3/2002 | Vargo et al. | |
| 6,370,631 B1 | * | 4/2002 | Dye | 711/170 |
| 6,549,587 B1 | * | 4/2003 | Li | 375/326 |
| 6,847,636 B1 | | 1/2005 | Choi | |
| 7,089,391 B2 | * | 8/2006 | Geiger et al. | 711/170 |
| 7,251,480 B1 | * | 7/2007 | Oh et al. | 455/413 |
| 7,266,611 B2 | * | 9/2007 | Jabri et al. | 709/231 |
| 7,423,983 B1 | * | 9/2008 | Li et al. | 370/280 |
| 7,474,673 B1 | * | 1/2009 | Kennealy | 370/466 |
| 7,548,987 B2 | * | 6/2009 | Jabri et al. | 709/231 |
| 7,590,759 B2 | * | 9/2009 | Omar et al. | 709/246 |
| 7,711,856 B1 | | 5/2010 | Lin et al. | |
| 7,773,741 B1 | * | 8/2010 | LeBlanc et al. | 379/406.01 |
| 2003/0018983 A1 | * | 1/2003 | Kawabata et al. | 725/151 |

(Continued)

*Primary Examiner* — Ario Etienne
*Assistant Examiner* — Sargon Nano
(74) *Attorney, Agent, or Firm* — Ridout & Maybee LLP (57) ABSTRACT

A method and apparatus for accessing messages from a message server. Messages are stored on the message server in their current format without transcoding. When a client opens a session with the message server, a data transfer rate is determined for the client. In response to a message retrieve request, the bit rate of the message is compared to the data transfer rate, and if less than the data transfer rate, the message is downloaded to the user terminal without transcoding. If the bit rate is greater than the data transfer rate, then the message is transcoded to a lower bit rate according to a codec supported by the user. The codec may be selected from a set of codecs supported by the user terminal. The user is provided with the capability to override the system selected codec, for example, to pick a codec for secure encoding or encryption.

1 Claim, 4 Drawing Sheets

U.S. PATENT DOCUMENTS

| | | | |
|---|---|---|---|
| 2003/0028643 A1* | 2/2003 | Jabri | 709/226 |
| 2003/0187930 A1* | 10/2003 | Ghaffar et al. | 709/205 |
| 2003/0187936 A1* | 10/2003 | Bodin et al. | 709/206 |
| 2003/0200337 A1* | 10/2003 | Jabri et al. | 709/246 |
| 2003/0224760 A1* | 12/2003 | Day | 455/412.1 |
| 2004/0015589 A1* | 1/2004 | Isozu | 709/227 |
| 2004/0196900 A1 | 10/2004 | Lim et al. | |
| 2005/0091696 A1 | 4/2005 | Wolfe et al. | |
| 2005/0108088 A1 | 5/2005 | Suerbaum | |
| 2005/0256974 A1* | 11/2005 | Teodosiu et al. | 709/247 |
| 2006/0031369 A1* | 2/2006 | Caron et al. | 709/207 |
| 2006/0047855 A1* | 3/2006 | Gurevich et al. | 709/247 |
| 2006/0085561 A1* | 4/2006 | Manasse et al. | 709/247 |
| 2006/0140359 A1* | 6/2006 | Sealey et al. | 379/88.17 |
| 2009/0300205 A1* | 12/2009 | Jabri | 709/231 |

\* cited by examiner

METHOD AND APPARATUS FOR PROVIDING AN INTERFACE FOR A MESSAGING MAILBOX

CROSS REFERENCE TO RELATED APPLICATION

The present application is a divisional application of U.S. patent application Ser. No. 10/955,197, filed Sep. 30, 2004, the contents of which are hereby incorporated herein by reference.

FIELD OF THE INVENTION

The present invention relates to communication systems, and more particularly to a method and apparatus for providing an interface for a message mailbox in a communication system.

BACKGROUND OF THE INVENTION

Voice over Internet (i.e. VoIP) communication terminals provide the capability to receive both voice mail messages and conventional email or data messages. Such systems may incorporate unified messaging. In unified messaging, voice messages show up as items in an email inbox.

When the client, i.e. user, retrieves the voice message, a file is read from the message stored in the communication terminal and sent across the communication network to the message server to retrieve the voice message stream. The message server includes an inbox which stores the voice messages for the user.

The inboxes in a unified messaging system are accessed from the message server over network connections, e.g. Internet network connections, having varying speeds, i.e. bandwidths or data transfer rates. As a result, a single encoding, i.e. digital conversion, for voice messages is not suitable for all speeds. For example, the G.711 encoding protocol has a bit rate of 64 kbit/s. This bit rate is suitable for transmission over an office LAN, but will be constrained and too slow over a 28.8 kbit/s dial-up network connection.

Various approaches have been tried in the art. One approach involves always using the lowest bit rate codec (Coder/Decoder) for storage. But when there is abundant bandwidth in the network connection, there will be extra transcodings, i.e., conversions between different codecs or voice compression formats, which increases the load in the messaging system. Transcoding also degrades voice quality.

Another known approach comprises a per user configuration. If a user can access a unified messaging system over a slow dial-up network connection, then all of the user's messages are stored using a low bit rate codec, i.e. tailored to the bandwidth of the dial-up network connection. However, this means that the voice quality the user gets if accessing the unified messaging inbox using a broadband (i.e. high bandwidth) network connection will be a lower voice quality for the voice message. For example, a user in the office configured with a low bit rate codec (e.g., for dial-up access) will experience lower voice quality than a co-worker who has voice messages configured for broadband access, even though both office workers are accessing their messages over the same LAN in the office. Furthermore, a user who is not configured with a low bit rate setting (i.e. low bit rate codec) might want to access their unified messaging inbox over a network connection from a hotel.

Yet another approach involves allowing a voice message to appear several times in the unified messaging inbox, with each appearance corresponding to a particular encoding (i.e. codec). The user then decides on which encoding to use by selecting the appropriate appearance, e.g. icon, of the voice message. It will be appreciated that this approach tends to clutter up the user's inbox, and requires the user to correlate the available bandwidth capacity with the appropriate voice message icon. Furthermore, when any one version of a message is deleted, all of the other versions of the message must also be deleted or erased.

In view of these deficiencies in the art, there remains a need for a mechanism for varying encoding of voice messages in a unified messaging system.

BRIEF SUMMARY OF THE INVENTION

The present invention provides a method and apparatus for storing and accessing voice messages in a unified messaging system.

In a first aspect, the present invention provides a method for accessing messages stored in a message server, the method comprises the steps of: determining a session data transfer rate when a client opens a session with the message server; determining one or more codecs supported by the client; in response to an access request by the client to the message server, determining a data transfer rate for the stored message and comparing the message data transfer rate with the session data transfer rate; if the message data transfer rate is less than the session data transfer rate, transferring the message to the client without transcoding; if the message data transfer rate is greater than the session data transfer rate, transcoding the message prior to transferring the message to the client.

In another aspect, the present invention provides an apparatus for accessing messages in a message server, the apparatus comprises: means for determining a session data transfer rate when a client opens a session with the message server; means for determining one or more codecs supported by the client; means responsive to an access request by the client to the message server for determining a data transfer rate for the stored message and comparing the message data transfer rate with the session data transfer rate; means for transferring the message to the client without transcoding in response to the message data transfer rate being less than the session data transfer rate, means for transcoding the message prior to transferring the message to the client in response to the message data transfer rate is greater than the session data transfer rate.

In a further aspect, the present invention provides an apparatus for retrieving messages in a communication system, the communication system includes a network, a message server coupled to the network, a plurality of communication terminals each coupled to the network, and a call server for establishing connections over the network between the communication terminals, the apparatus comprises: a component for storing messages in the message server, the messages are stored without transcoding; a component for determining a data transfer rate in response to a communication terminal opening a session with the message server; a component for determining one or more codecs supported the communication terminal for the opened session; a component for determining a bit rate for each of the messages associated with the communication terminal for the opened session; a component responsive to a message request from the communication terminal for the opened session for comparing the bit rate for the requested message to the transfer rate; a component for transmitting the message without transcoding if the bit rate is less than the data transfer rate; a component for transcoding the message prior to transmitting to the communication if the bit rate is greater than the data transfer rate, wherein the message is transcoded according to one of the codecs supported by the communication terminal.

In yet another aspect, the present invention provides a computer program product having a computer-readable medium tangibly embodying computer executable instructions for accessing messages stored on a message server, comprising: computer executable instructions for determining a session data transfer rate when a client opens a session with the message server; computer executable instructions for determining one or more codecs supported by the client; computer executable instructions responsive to a message access request by the client to the message server for determining a data transfer rate for the stored message and for comparing the message data transfer rate with the session data transfer rate; computer executable instructions for transferring the message to the client without transcoding if the message transfer rate is less than the session data rate; computer executable instructions for transcoding the message prior to transferring the message to the client if the message transfer rate is greater than the session data rate.

In a further aspect, the present invention provides an email server for a communication system, the email server comprises: a component for storing messages in the email server, the messages are stored without transcoding; a component for receiving an access request from a communication terminal; a component for determining a media type for the communication terminal making the access request; a component for retrieving a message corresponding to the access request; a component for formatting said retrieved message according to the media type for said communication terminal.

Other aspects and functions of the present invention will become apparent to those ordinarily skilled in the art upon review of the following description of specific embodiments of the invention in conjunction with the accompanying drawings.

BRIEF SUMMARY OF THE DRAWINGS

Reference is now made to the accompanying drawings, which show by way of example, embodiments of the present invention, and in which.

In the drawings, like references indicate like elements or components.

DETAILED DESCRIPTION OF THE EMBODIMENTS

Figure 1:
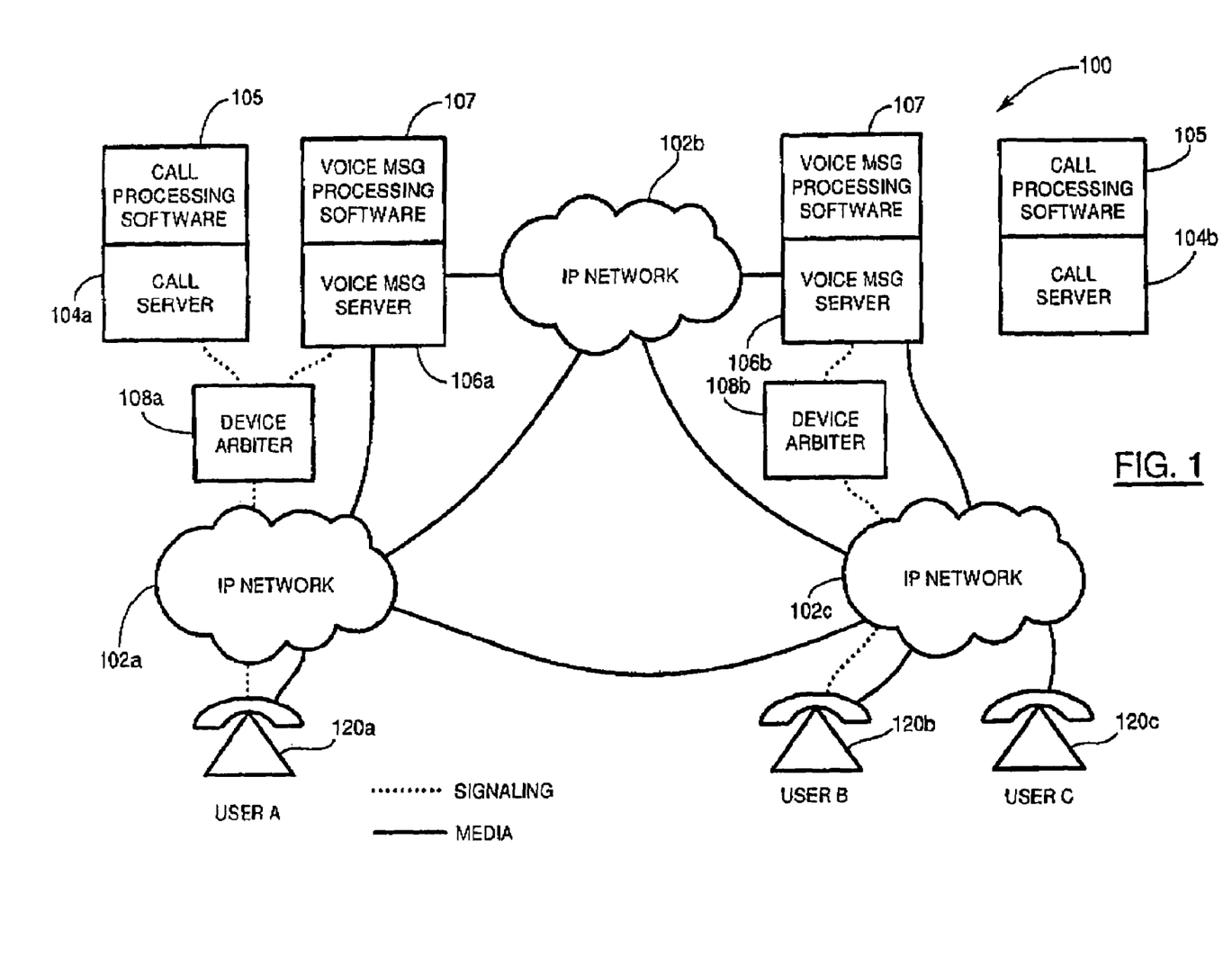
FIG. 1 shows in diagrammatic form an Internet phone system utilizing a voice messaging system in accordance with the present invention.

Reference is first made to FIG. 1 which shows in diagrammatic form an Internet phone system utilizing a voice messaging system according to the present invention. The Internet phone system is indicated generally by reference 100. While the present invention is described in the context of an Internet phone system, it will be appreciated that the invention has wider applicability and is suitable for other types of telecommunication, PBX (private branch exchanges), telephony systems or networked communication systems.

As shown in FIG. 1, the Internet phone system 100 comprises a communication network 102, call servers 104 (indicated individually as 104a and 104b), voice message servers 106 and Internet VoIP (Voice over Internet Protocol) telephones 120. In FIG. 1, the voice message servers 106 are shown individually as 106a, 106b. The system 100 may also include device arbiters 108, which are shown individually as 108a and 108b. The communication network 102 comprises the Internet which is formed as a network of networks, indicated individually by references 102a, 102b and 102c in FIG. 1. The Internet 102 provides a wide area network for communication according to standardized and/or proprietary Internet protocols as will be within the understanding of those skilled in the art.

The Internet telephones 120 are shown individually as 120a, 120b and 120c, and may comprise the Nortel i2004™ series IP Telephone from Nortel Networks Inc. One or more of the Internet telephones 120 may be replaced by a TDM (Time Division Multiplexed) phone operating in a hybrid system. The Internet telephones 120 include one or more function buttons (not shown) and work together with the call servers 104 to provide telephony features, such as, Call Forward, Call Transfer, and Conference. The call servers 104 include a call server processor or call processing software indicated by reference 105 in FIG. 1.

The voice message servers 106 (shown individually as 106a and 106b in FIG. 1) provide the functionality associated with the voice messaging and voice messaging interface in accordance with the present invention as described in more detail below. The voice message server 106 comprises a voice messaging processor or voice message processing software indicated by reference 107 in FIG. 1. In one embodiment, the voice message server 106 comprises a functional module implemented in software, and as such may be implemented with the call server 104. For example, the voice message server 106 and its associated functionality may be integrated into the Call Pilot™ system from Nortel Networks Inc. In another embodiment, the voice message server 106 is implemented as an add-on module. The particular implementation details for the voice message servers 106 and associated functionality/features will be within the understanding of those skilled in the art.

Figure 2:
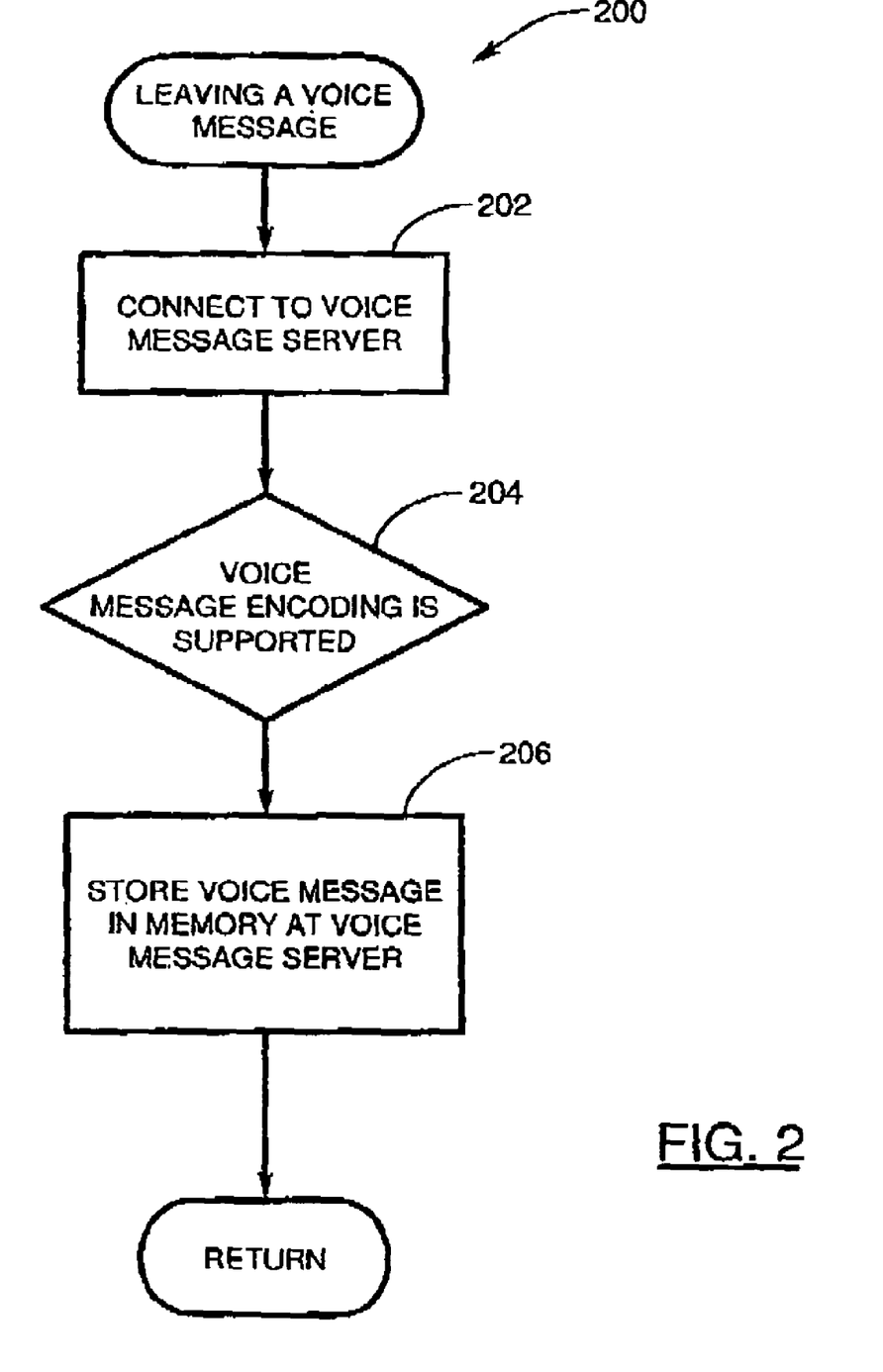
FIG. 2 shows in flowchart form a process for leaving a voice message in accordance with the present invention for the voice messaging system of FIG. 1.

Reference is made to FIG. 2, which shows in flowchart form a process for leaving a voice message in accordance with an aspect of the present invention and indicated generally by reference 200. In step 202, a connection is made to the voice message server 106 (FIG. 1). The connection may be made by the call server 104 through the call processing software 105, for example, in response to the called or endpoint station being on another call or in do not disturb mode. The connection may also be made via the device arbiter 108 (FIG. 1), for example in response to a user input or key press at the client's terminal. Next in step 204, a check may be made to determine if the encoding of the voice message is supported by the voice message server 106. In most implementations, the voice message server 106 is configured to support all principle encoding formats or protocols, such as G.711, G.723.1, G.729, ADPCM (Adaptive Differential Pulse Code Modulation), PCM (Pulse Code Modulation) and therefore the operation in step 204 can be optional. In step 206, the voice message is stored at the voice message server 106 (i.e. in message memory) in its current encoded format, i.e. no transcoding or translation of the voice message is performed before saving in memory.

Figure 3:
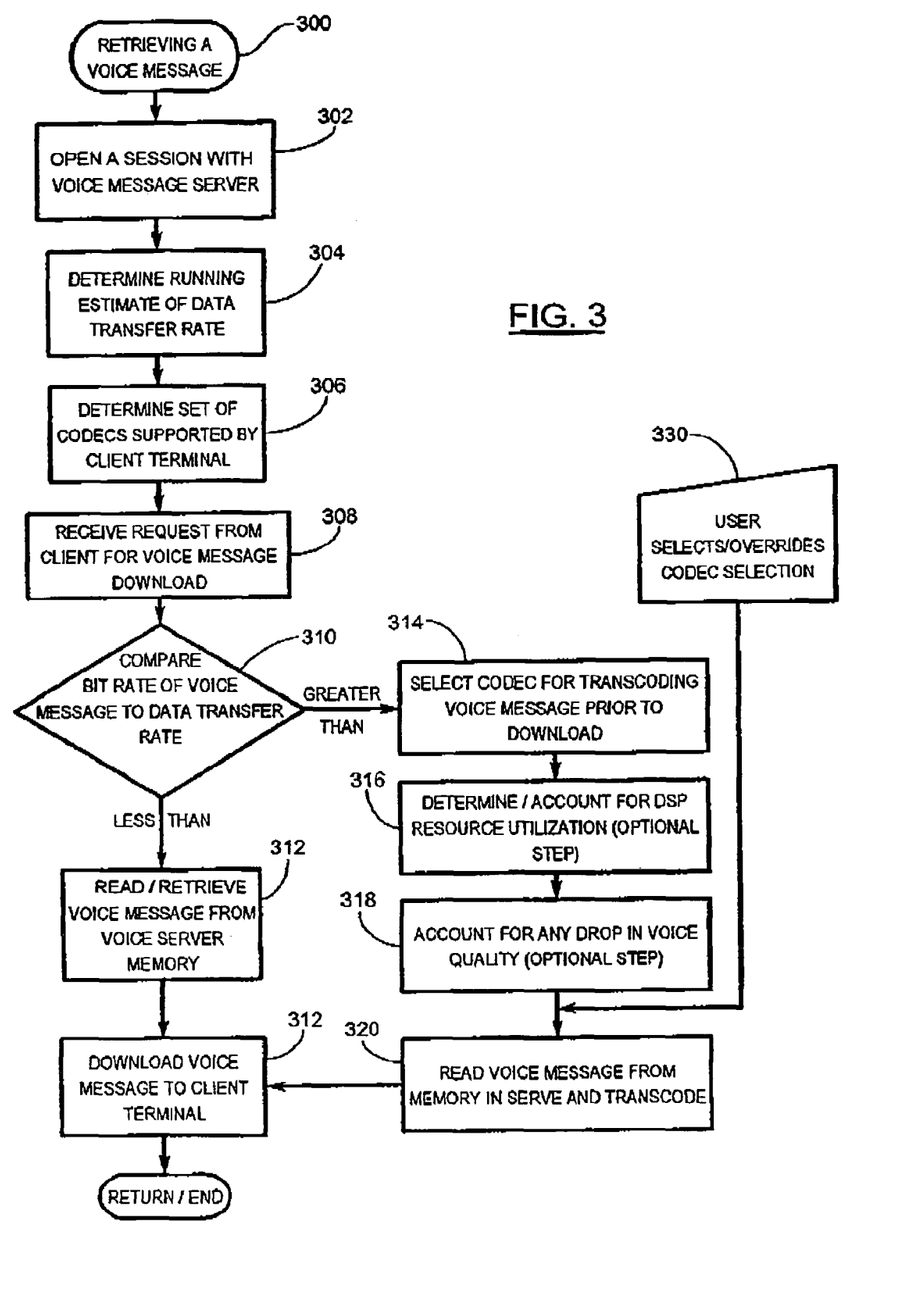
FIG. 3 shows in flowchart form a process for retrieving or accessing a voice message or voice messages in accordance with the present invention for the voice messaging system of FIG. 1.

Reference is next made to FIG. 3, which shows in flowchart form a process for retrieving a voice message in accordance with another aspect of the present invention and indicated generally by reference 300. In step 302, a session with the voice message server 106 (FIG. 1) is opened, for example, in response to a client calling in to retrieve voice messages, or to change a voice mail greeting. During the session, the voice message processing software 107 executes a function to determine a running estimate of the data transfer rate with the client terminal 120 as indicated in step 304. The running estimate of the data transfer rate may be determined by using a protocol stack for IMAP (Internet Message Access Protocol), TCP (Transmission Control Protocol) and IP (Internet Protocol). IMAP runs over the TCP layer which sends a number of bytes equal to a window size before pausing to wait for acknowledgement from the other side. The window size comprises an operating system parameter. Using this mechanism, throughput or data transfer rates is calculated as 'window size'/'round trip delay'. The round trip delay will depend on the connection, and may be estimated by "pinging" the other side, i.e., far end. Pinging involves sending an ICMP (Internet Control Message Protocol) echo message as part of the IP layer and waiting for the Internet Protocol (IP) layer at the other side or far end to respond. By repeating the pinging operation a few times and averaging the results provides a good estimate of the round trip delay.

Next in step 306, a component or function in the voice message processing software 107 determines which codecs are supported by the terminal 120 of the client. The codecs supported may be determined according to the messaging program and version or release present on the user's terminal. The supported codecs may also be determined using an IMAP mechanism. IMAP also includes an extension mechanism for downloading email from a server, and any command starting with an "X" comprises an extension. For example, support for three codecs, G.711, G.729A, G.723.1, is indicated by a message XCODECS G.711 G.729A G.723.1. It will be appreciated that not all of the client terminals 120 will support all or even most codecs, for example, because of hardware limitations and/or license limitations. The set of codecs supported are stored for later reference should transcoding of voice message download to the client be required as described in more detail below. In response to request from the client for a voice message download (e.g. a key press by the user to listen to new voice mail message(s)) in step 308, the process 300 determines if transcoding of the voice message is necessary before downloading to the client. In decision block 310, the bit rate of the voice message for downloading is compared to the data transfer rate determined in step 304. If the bit rate is less, for example, by a predetermined amount or within a threshold, than the data transfer rate, then transcoding is not needed and the voice message is retrieved from memory in the server 106 and downloaded without modification to the client terminal 120 (as indicated in step 312). If the bit rate is greater than the data transfer rate (as determined in decision block 310), then the voice message needs to be transcoded before downloading to the client. In step 314, a codec is selected for transcoding the voice message. The voice message processing software 107 (FIG. 1) includes a function or component for selecting a codec from the set of codecs determined in step 306. The voice message processing software 107 may include an additional processing step 316 and/or processing step 318. In step 316, DSP (Digital Signal Processor) resource utilization is taken into account in the selection of a suitable codec from the set of codecs determined in step 306. The voice message processing software 107 may include a function or code component for determining a utilization factor associated with the selected codec as indicated in step 316, and if the utilization factors exceeds a predetermined threshold, then another codec is selected from the set of supported codecs (i.e. as determined in step 306). The voice message processing software 107 may include a function or code component for minimizing a drop in voice quality as a result of the transcoding operation as indicated in step 318. For example, transcoding from one CELP (Codeback Excited Linear Prediction) codec, such as a G.711, to another CELP codes, such as a G.729, results in a drop in voice quality. In such as case, the function can choose to transcode from CELP to ADPCM which doesn't result in a significant drop in voice quality. In step 320, the voice message is read or retrieved from memory in the voice message server 106 and transcoded according to the selected codec format. The transcoded voice message is then downloaded to the client terminal 120 (FIG. 1) by transmitting the voice packet across the network 102 (FIG. 1).

Referring again to FIG. 3, the process for retrieving a voice message 300 includes a user override or codec selection step 330. In step 330, the voice message server processor 106 responds to a user (i.e. client) input to override the system codec selection. The override may be initiated by right clicking the voice (email) indicator or icon for a pull-down codec list and selection menu. The user may wish to override the codec selection for example, to select a secure or encrypted transcoding, or for example, if the user wishes to maintain the higher voice quality (e.g. G. 711) albeit at a slower transmission rate over a slower dial-up connection.

The user override or codec selection operation may be implemented using a mechanism based on the email message structure. As defined by the multipurpose Internet mail extensions (MIME), part 2, the structure of an email message may contain a section with multiple alternative formats, for example:

```
Content- Type: multipart/alternative;
boundary="gc0pJq0M:08jU534c0p"
--gc0pJq0M:08j U534c0p
Content- Type: audio/x-wav
G.711 wave file
--gc0pJq0M:08j U534c0p
Content- Type: audio/x-wav
G.729A wave file
--gc0pJq0M:08j U534c0p
Content- Type: audio/x-wav
G.723.1 wave file
----gc0pJq0M:08 jU534c0p--
```

IMAP allows the email client to query the structure of an email message without downloading the complete email message. Using this information, a client is able to display the possible formats for a voice mail or voice message attachment. IMAP also provides the capability to download a single part in a multipart/alternative to be download, which can be used for triggering transcoding.

In operation, each voice message appears as a single item in the client's inbox. The voice messaging system according to the present invention generates an email icon and the size of the voice message may be indicated in units of time or memory. In the context of the present invention, the size of the voice message is indicated in units of time. Starting from the moment that a client opens a session with the voice message server (i.e. one of the servers 106 as depicted in FIG. 1), a module or component in the call processing software (i.e. indicated by reference 105 in FIG. 1) and/or the voice message processing software (i.e. indicated by reference 107 in FIG. 1) keeps a running estimate of the data transfer rate to the client (i.e. one of the terminals 120 as depicted in FIG. 1) for the voice message. When a clients requests a voice message download (for example, by double-clicking the email icon), the call server and/or voice message processing software compares the bit rate of the voice message as stored on the voice message server with the session data transfer rate (as determined previously). If the bit rate of the voice message is less than the session data transfer rate (for example, by a predetermined amount or threshold), then the data rate of the encoding for the voice message is supported and no further transcoding (e.g. data rate conversion) is necessary. The voice message server 106 reads the message from memory storage on the server 106 and the voice message is sent or transmitted across the IP network 102 (FIG. 1) without any modification. If the bit rate of the voice message is greater than the session data transfer rate (for example, by a predetermined amount or threshold), then the data rate of the encoding for the voice message is not supported, i.e. exceeds the bandwidth for the connection between the voice message server and the client's terminal, and transcoding will be necessary to download or transfer the voice message. For transcoding, the voice message processing software (or the call server processing software) includes a module or component for selecting a codec having a bit rate that is less the session data transfer rate and which codec is also supported by the client's terminal 120 (FIG. 1). The voice message processing software then reads the voice message from memory on the voice message server 106, decodes the voice message if not encoded as a straight PCM, and then encodes the PCM stream with the selected codec. The encoded voice message output from the codec is then transmitted from the server across the network 102 to the client's terminal 120.

According to another aspect, the processing module or component for the voice message server processor may also include additional logic or processing for determining codec selection. The codec selection mechanism may also take into account digital signal processing (DSP) utilization on the voice message server 106, as the various codec encodings will result in varying loading on the CPU (Central Processing Unit) during the digital signal processing. The codec selection mechanism may also take into account the current encoding of the voice message to minimize or manage effects on voice quality. For example, transcoding from a CELP (i.e. Codeback Excited Linear Prediction encoding in G.711 or G.729) type codec to another CELP type codec can result in a large drop in voice quality. Under such a situation logic is provided to transcode from CELP to ADPCM (Adaptive Differential PCM) which doesn't result in such an appreciable drop in voice quality.

According to another aspect, the codec selection mechanism may also include a user selection or override mode. This allows a client to override the codec selection by the system and choose another particular codec for transcoding the voice message.

Figure 4:
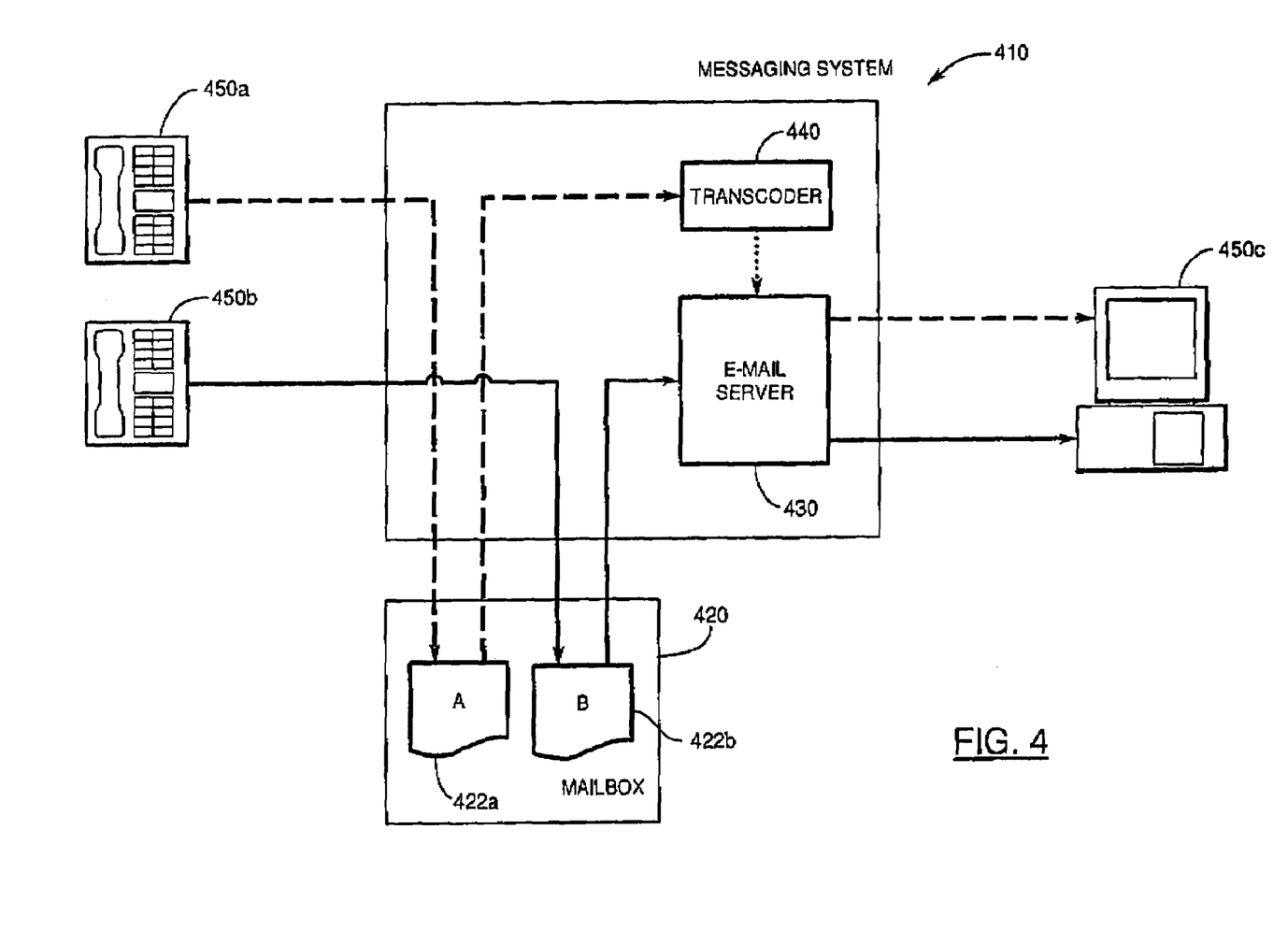
FIG. 4 shows in diagrammatic form operation of a messaging system in accordance with the present invention.

Reference is next made to FIG. 4, which shows operation of a messaging system 410 according to the present invention. The messaging system 410 comprises a mailbox 420 for storing voice messages 422, an email server 430, and a transcoder 440. According to this example, two communication terminals 450*a* and 450*b* (for example, Internet telephones, or an Internet VoIP phone and a TDM (Time Division Multiplex) phone in a hybrid system) leave voice messages 422*a* and 422*b*, respectively, for an integrated voice/data terminal indicated by reference 450*c*, for example, a PC (personal computer) based email client or subscriber. The first voice message 422*a* is stored in the compression format or codec as received (Le. without transcoding), for example G.711. The second voice message 422*b* is also stored in the compression format or codec as received, for example, G.729A. The email server 430 indicates to the voice/data terminal 450*c* the presence of the two (voice) messages 422*a* and 422*b*, Le. as inbox items. The voice/data terminal 450*c* opens a session with the email server 430 to retrieve the messages 422*a* and/or 422*b*. A function or routine in the voice message processing software determines that the voice/data terminal 450*c* supports the codec for G.729A (for example over a dial-up connection. Another function or routine determines a session data transfer rate. When the voice/data terminal 450*c* requests the first voice message 422*a* which is encoded in G. 711, the voice message processing software invokes the transcoder 440 to transcode the G.711 encoded message 422*a* to a G.729A coded message. The second voice message 422*b* is downloaded to the voice/data terminal 450*c* by the voice message processing software without transcoding as it comprises a G.729A encoded message. Similarly, if the calculated session data rate does not support the bit rate for the compression formats of the voice messages, the voice message processing software will invoke transcoding as required.

It will be appreciated that according to this aspect, the email server 430 is integrated with the messaging system 410 and this arrangement allows requests from a client (e.g. the voice/data terminal 450*c*) to trigger processing by invoking a program component for transcoding. The handling of multimedia messages (e.g. combined voice and data messages) by the messaging system 410 will vary depending on how the multimedia message is accessed. For example, if the multimedia message is accessed by a phone (e.g. an Internet VoIP phone or a TDM phone in a hybrid system), the messaging system 410 plays back the voice message component. If the multimedia message is accessed by a computer email client (e.g. a PC-based voice/data terminal 450*c*), then the messaging system 410 generates an email message on the PC comprising a text component and an attachment which contains the voice message. If the multimedia message is accessed by a personal email device (e.g. a Blackberry handheld from RIM), then the messaging system 410 generates an email message for the device comprising only the text component of the multimedia message. According to this aspect, the system tailors the message according to the media type supported or appropriate to the requesting terminal. In the latter two cases, the message processing software for the messaging system 410 utilizes the integrated email server 430. In the third case, the message processor software senses the client (e.g. Blackberry handheld) and tailors the email message based on the capabilities of the client device. In the first case, the messaging system 410 plays back the voice message component without involving the integrated email server 430. The particular implementation details for these functions or program components in the messaging system 410 to handle these and other similar situations will be within the understanding of those skilled in the art.

The present invention may be embodied in other specific forms without departing from the spirit or essential characteristics thereof. Other adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An email server for a communication system, said email server comprising:
- a memory for storing messages in the email server, said messages being stored without transcoding;
- a component for receiving an access request from a communication terminal;
- a hardware processor for determining a type for said communication terminal making said access request;
- a component for retrieving a message corresponding to said access request;
- a component for formatting said retrieved message according to the type for said communication terminal;
- a component for determining a data transfer rate in response to said communication terminal opening a session with the email server;
- a component for determining one or more codecs supported the communication terminal for said opened session;
- a component for determining a bit rate for each of the messages associated with the communication terminal for said opened session;
- a component for comparing said bit rate for said requested message to said data transfer rate;
- a component for transmitting the message without transcoding if said bit rate is less than said data transfer rate;
- a component for transcoding the message prior to transmitting to the communication if said bit rate is greater than said data transfer rate, wherein the message is transcoded according to one of said codecs supported by the communication terminal.

* * * * *